United States Patent Office 3,689,319
Patented Sept. 5, 1972

3,689,319
PARAFFIN REMOVAL PROCESS
Thomas E. Sample, Jr., and Jack F. Tate, Houston, Tex., assignors to Texaco Inc., New York, N.Y.
No Drawing. Filed Nov. 2, 1970, Ser. No. 86,382
Int. Cl. E21b 21/00; B08b 3/08, 9/02
U.S. Cl. 134—40
6 Claims

ABSTRACT OF THE DISCLOSURE

Solid paraffin-like hydrocarbon materials deposited on the surfaces of oil well production equipment are removed by contacting the solid deposits with certain hydrolyzable, aprotic, halogenated organic materials, such as allyl chloride, and the halogenated organic compound containing the dissolved or peptized paraffin is removed from the equipment and conducted to a vessel containing water or a base dissolved in water.

FIELD OF THE INVENTION

This invention relates to a process for removing solid paraffin-like hydrocarbon materials deposited on surfaces of oil well production equipment. More particularly, this invention relates to a process utilizing certain hydrolyzable, aprotic, halogenated organic compounds as paraffin removal agents.

DESCRIPTION OF THE PRIOR ART

The accumulation and adhesion of paraffin-like hydrocarbon materials on the surfaces of oil-producing and oil-handling equipment has long been recognized as a major problem in the production, transfer and storage of crude petroleum. Accumulations of these solid or semi-solid paraffin-like hydrocarbon materials on the walls of metal tubing, pumping assemblies, valves, chokes, gauges, storage tanks, and so forth, can result in a variety of operating problems in oil handling equipment.

The term "paraffin" as used throughout this specification refers to any material which is insoluble, sparingly soluble, or undispersible in crude oil under conditions of production. Thus, the paraffin deposit may contain high molecular weight aliphatic hydrocarbons, petroleum resins, asphaltic materials, aromatic hydrocarbons, and mineral matter. As will be understood by those skilled in the art, the composition of such deposits varies from one crude oil type to another, from one field to another, from one well to another in the same field and even at different depths from the same well.

Crude oil, as it first comes in contact with a restraining wall, e.g., the interior of a confining vessel, often contains the above-described paraffin-like hydrocarbon materials which are in solution or otherwise flowable at the time of such first contact but subsequent thereto and prior to the termination of the contact with the confining vessel or wall separate as non-flowable substances. Such substances are often deposited on the walls in such a manner that they are tenaciously bonded thereto and the removal of such materials can only be accomplished at considerable cost, inconvenience and time lost from production.

Several theories have been advanced as to why the deposition of such paraffin-like hydrocarbon materials occurs. The paraffins in the fluid stream may undergo a change of state from liquid to solid during a drop in temperature or rate of flow or other altered conditions which occur during the contact with the walls of the oil-producing and oil-handling equipment. Although a change in temperature is considered a fundamental cause for deposition of paraffin, other factors are believed to contribute to such deposition, among which are: alternate coating and draining of oil from a surface, change in flow rate, change in agitation, presence of mineral matter, roughness or smoothness of the confining surface, expansion of the more volatile constituents from the oil, changes in the viscosity of the oil, and other conditions, which are not fully understood, that appear to encourage aggregation of the paraffin present in the oil on the surfaces with which the oil comes in contact.

A great number of processes have been advanced and utilized in attempts to overcome the problems of paraffin deposition in oil well tubing, surface level equipment, storage tanks, pumping assemblies, etc. However, all of these processes suffer from one or more serious disadvantages. Paraffin deposits may be removed by both physical and chemical means. One such method is by mechanical scraping with especially designed instruments, the procedure sometimes being referred to as "knifing." Another physical process is that of removal by passing hot petroleum oils, e.g., at a temperature of between about 300° and 400° F., through the equipment from which the deposit is sought to be removed. The hot oil which represents considerable cost in heating, pumping and the like has a relatively low solvency for paraffin, and scraping is not applicable to removal of paraffin from pumps, valves, etc.

A wide variety of solvents, such as those disclosed in U.S. Pat. 3,162,601, have been employed to remove paraffin deposits. Moreover, some solvent formulations have been developed that will react in part with the well fluid to produce heat in addition to the solvent action. Other chemical formulations have been employed to form a soluble "plug" which has both mechanical and solvent functions. Various chemical methods and compositions for coating petroleum conduits and containers to prevent or retard paraffin deposition have been developed such as those described in U.S. Pat. 3,249,535. The use of certain amino acid paraffin deposition inhibitory agents is described in U.S. Pat. 3,102,859. Although in some instances combinations of certain of the above methods have been employed, the problem still remains.

Certain organic substances such as highly stable, halogenated organic compounds, such as carbon tetrachloride, and carbon disulfide have been employed with success for the dissolution or dispersion of the paraffin-like hydrocarbons. The use of highly stable, halogenated organic compounds is usually not permitted in oil production operations because of the risk of their carry-over to the refinery where such materials poison cracking catalysts and cause certain other operation problems. The employment of carbon disulfide for paraffin removal operations is likewise restricted because of the hazardous nature of this toxic compound which exhibits extremely low flash and autoignition points, even though it is perhaps the most effective paraffin solvent known. It is therefore an object of the present invention to provide a method for removing paraffin deposits in oil well production equipment which mitigates these problems.

Another object of this invention is to provide a method which is economical and which can be employed for removing paraffin deposits from equipment in place.

Another object of the present invention is to provide a novel method of removing paraffin deposits utilizing the solvent and dispersing action of certain hydrolyzable, aprotic, halogenated organic materials.

SUMMARY OF THE INVENTION

This invention relates to a process for removing solid or semi-solid paraffin-like hydrocarbon materials from oil-well production equipment, such as the walls of metal tubing, pumping assemblies, chokes, valves, gauges, storage tanks, etc., which comprises contacting the deposits of the said solid or semi-solid paraffin-like hydrocarbon materials with hydrolyzable, aprotic, halogenated organic materials, such as allyl chloride. The hydrolyzable, aprotic, halogenated organic compound containing the dissolved or peptized paraffin is removed from the equipment and conducted to a vessel containing water or a base dissolved in water.

DETAILED DESCRIPTION OF THE INVENTION

The process of the present invention comprises contacting paraffin-like hydrocarbon materials deposited on oil-well production equipment with certain hydrolyzable, aprotic, halogenated organic materials. The hydrolyzable, aprotic, halogenated organic materials utilized in the process of this invention are capable of dissolving and/or dispersing the paraffin-like hydrocarbon solids from oil-well equipment. One important advantage embodied in this invention is that these halogenated compounds may be conveniently decomposed by reaction with a hydroxylic solvent (for example, water in the presence or absence of base) subsequent to the dissolution or peptization of the paraffin. Thus, the carryover of any of the halogenated compounds employed in the process of this invention in removing the paraffin-like deposits can be avoided by simple treatment with water and/or base. In addition, the hydrolyzable, aprotic, halogenated organic materials are considerably less toxic, flammable and dangerous than the aforementioned carbon disulfide.

Hydrolyzable, aprotic, halogenated organic materials which are suitable for the practice of this invention broadly encompass those halogen-containing organic compounds, both simple and poly-functional, which are sufficiently active to hydrolyze at a finite rate subsequent to dissolution or peptization of the paraffin deposit. Substances useful for the purpose of this invention include the following types of organic halogen compounds: allylic or propargylic halides, alpha-haloalkyl aryl compounds, etc. and mixtures thereof. Vinyl and aprotic aryl halides are ordinarily not sufficiently susceptible to hydrolysis within the conditions of this invention to be generally useful for its practice.

Illustrative examples of organic halogenated compounds suitable for use in practicing the process of this invention include allyl chloride, 1-chloro-2-butene, propargyl chloride, benzyl chloride, benzylidene chloride, etc. The corresponding bromides and iodides, providing of course they are of sufficient stability, may also be utilized. Organic fluorides are generally less suitable as reactants because of their general resistance to hydrolysis.

In one embodiment, the hydrolyzable, aprotic halogenated organic solvent is introduced down the well bore of a producing well whose parts, such as the well tubing, are coated with a deposit of paraffin. A sufficient volume of the aprotic, halogenated material is utilized so that all parts coated with the paraffin are contacted. The duration of the exposure or time of contacting of the aprotic halogenated material with the paraffin deposit required to effect removal will depend upon a number of conditions, such as the extent of the deposition of the paraffin, its inherent solubility in the aprotic halogenated material, the tenacity with which the paraffin adheres, the temperature of the aprotic halogenated material, etc. After dissolution or dispersion of the paraffin is effected by the aprotic halogenated material, the aprotic halogenated material is removed from the well along with dissolved or dispersed paraffin and conducted to a tank containing water or a base dissolved in water and the well put back on production. In this manner, the hydrolyzable, aprotic, halogenated organic material is decomposed to an oxygenated organic compound and an inorganic halide, thus prohibiting any carry-over of the halogenated hydrocarbon to the refinery, and the paraffin separates from the mixture in the tank.

The following is a description by way of examples of two series of laboratory tests whereby the effectiveness of the present invention has been demonstrated.

In the first series of tests the ability of an aprotic halogenated compound, allyl chloride, to dissolve or disperse a variety of selected paraffins, obtained from producing wells, was shown. The composition of the various paraffin samples taken from the different wells is set forth in Table 1 which appears below:

TABLE 1.—COMPOSITION OF FIELD PARAFFIN SAMPLES

| Sample | Percent | | |
|---|---|---|---|
| | Aliphatic | Aromatic | Asphaltene |
| Handy Unit (Grayson County, Tex.) | 87.3 | 5.5 | 3.9 |
| Garden Island Bay Field (Plaquemines Parish, La.) | 76.2 | 11.3 | 10.5 |
| Mabee Field (Andrews County, Tex.) | 52.1 | 25.2 | 18.2 |
| West Cote Blanche Bay (St. Mary Parish, La.) | 66.8 | 9.1 | 20.3 |
| North Dayton Field (Liberty County, Tex.) | 93.5 | 4.4 | 3.5 |
| Velasquez Field (Colombia) | 62.1 | 14.1 | 12.6 |

In this first series of laboratory tests, the paraffin samples were deposited on the inside surface of glass vessels after which a measured volume of allyl chloride was added to each vessel. The vessels were then shaken and allowed to stand overnight. The ability of the allyl chloride to remove the various paraffin samples from the vessel surfaces and solubilize or disperse them is recorded in Table 2 which follows:

TABLE 2

| Paraffin sample source | Result |
|---|---|
| North Dayton Field, Tex. | d |
| Handy Unit, Tex. | s |
| West Cote Blanche Bay, La. Well A | d |
| West Cote Blanche Bay, La. Well B | d |
| Mabee Field, Tex. | d |
| Velasquez Field, Columbia | d |
| Cherry Canyon Field, Tex. | d | d=dispersion, removal of adhered paraffin.
s=solution, no particulate matter remaining.

These laboratory tests show that allyl chloride is capable of solubilizing and dispersing a wide variety of paraffin samples of greatly varying chemical composition. In further tests in which carbon disulfide was employed in the same procedure, it was found that allyl chloride is as effective as the carbon disulfide in removing and dispersing the paraffin samples tested.

In a second series of tests performed in order to evalute the effectiveness of allyl chloride as a paraffin solvent/disperser and to compare its solubilizing ability with widely used commercial proprietary, paraffin solvents, an apparatus was fabricated such that the solvents could be continuously circulated through a section of stainless-steel tubing, the inside of which had been coated prior to the experiment with a field paraffin sample.

Six field paraffin samples which were the same as those shown in Table 1 were selected for testing based on their different geological occurrence, physical properties, and their percent composition of paraffin (aliphatics), aromatics, and asphaltenes, determined by silica gel chromatography.

In this second series of tests, an approximately 12 gram deposit of the field paraffin was caused to adhere to the inner wall of the stainless steel tube. One liter of the solvent system to be evaluated was placed in a reservoir and was circulated through the stainless steel tube for 0.5 hour. A portion of the solvent was then closed into the stainless steel tube and allowed to soak for 16 hours, followed by circulation of the solvent as before for a period of 2 hours. The stainless steel tube was then removed, and following air drying to a constant weight, the percent of the paraffin deposit removed was calculated from the weights of the tube prior to and following treatment with the solvent.

The results of six tests carried out with different field paraffin samples are set forth in Table 3 which follows:

TABLE 3

| Solvent | Percent of paraffin deposit removed | | |
|---|---|---|---|
| | Allyl chloride | A [1] | B [2] |
| Sample: | | | |
| Handy Unit (Grayson County, Tex.) | 85.4 | 19.3 | 95.8 |
| Garden Island Bay Field (Plaquemines Parish, La.) | 59.6 | 3.1 | 22.1 |
| Mabee Field (Andrews County, Tex.) | 99.8 | 33.3 | 92.1 |
| West Cote Blanche Bay (St. Mary Parish, La.) | 52.6 | | |
| North Dayton Field (Liberty County, Tex.) | 62.7 | | |
| Velasquez Field (Colombia) | 52.4 | | |

[1] A commercial proprietary paraffin solvent which is 100% aromatic.
[2] A commercial proprietary paraffin solvent consisting of mixed aromatics and terpenes.

These results indicate that allyl chloride is an effective material for removing solid paraffin-like deposits from oil-well production equipment. Further, these tests show that the allyl chloride is effective with a wide range of different paraffin compositions.

We claim:

1. A process for removing solid or semi-solid paraffin-like hydrocarbon materials deposited from crude petroleum on surfaces in oil-well production equipment, which comprises contacting the deposit of the said paraffin-like hydrocarbon materials with an hydrolyzable, aprotic, halogenated organic material which is sufficiently active to be decomposed at a finite rate by a hydroxylic material subsequent to dissolution or dispersion of the said paraffin-like hydrocarbon material, and wherein the said aprotic, halogenated material containing the paraffin-like hydrocarbon material dissolved or dispersed therein is removed from the equipment and subsequently reacted with a hydroxylic material.

2. The process of claim 1 wherein the said aprotic, halogenated material is selected from the group consisting of allylic halides, propargylic halides, alphahaloalkyl aryl compounds and mixtures thereof.

3. The process of claim 1 wherein the said aprotic, halogenated material is selected from the group consisting of allyl chloride, 1-chloro-2-butene, propargyl chloride, benzyl chloride and benzylidene chloride.

4. The process of claim 1 wherein the said aprotic, halogenated material is allyl chloride.

5. The method of claim 1 wherein the said aprotic, halogenated material is allyl chloride and the said hydroxylic material is water.

6. The method of claim 1 wherein the said aprotic, halogenated material is allyl chloride and the said hydroxylic material is water admixed with base.

References Cited
UNITED STATES PATENTS

| | | | |
|---|---|---|---|
| 2,225,434 | 12/1940 | Harrigan | 134—40 X |
| 2,805,200 | 9/1957 | Lee et al. | 252—8.55 B |
| 3,241,614 | 3/1966 | Bertness | 166—304 |

MORRIS O. WOLK, Primary Examiner

D. G. MILLMAN, Assistant Examiner

U.S. Cl. X.R.

134—22 C; 166—304; 252—8.55 B